(12) United States Patent
Colignon

(10) Patent No.: US 7,802,422 B2
(45) Date of Patent: Sep. 28, 2010

(54) METHOD OF ASSISTING REGENERATION OF POLLUTION MANAGEMENT MEANS ASSOCIATED WITH CATALYST FORMING MEANS

(75) Inventor: Christophe Colignon, Sannois (FR)

(73) Assignee: Peugeot Citroen Automobiles SA, Velizy Villacoublay (FR)

(*) Notice: Subject to any disclaimer, the term of this patent is extended or adjusted under 35 U.S.C. 154(b) by 890 days.

(21) Appl. No.: 11/571,254

(22) PCT Filed: Jun. 20, 2005

(86) PCT No.: PCT/FR2005/050464

§ 371 (c)(1),
(2), (4) Date: Dec. 22, 2006

(87) PCT Pub. No.: WO2006/005867

PCT Pub. Date: Jan. 19, 2006

(65) Prior Publication Data

US 2009/0193791 A1    Aug. 6, 2009

(30) Foreign Application Priority Data

Jun. 23, 2004 (FR) .................... 04 06858

(51) Int. Cl.
*F01N 3/00* (2006.01)
(52) U.S. Cl. .......................... 60/295; 60/286

(58) Field of Classification Search ............. 60/286, 60/295
See application file for complete search history.

(56) References Cited

U.S. PATENT DOCUMENTS

| 4,655,037 A | * | 4/1987 | Rao ............................ 60/274 |
| 5,207,990 A | * | 5/1993 | Sekiya et al. ............... 422/183 |
| 2003/0033800 A1 | | 2/2003 | Tonetti et al. |
| 2004/0016227 A1 | | 1/2004 | Kitahara |

FOREIGN PATENT DOCUMENTS

| EP | 1281852 A | 2/2003 |
| FR | 1130230 A | 9/2001 |

* cited by examiner

*Primary Examiner*—Thomas E Denion
*Assistant Examiner*—Michael Carton
(74) *Attorney, Agent, or Firm*—Nicolas E. Seckel

(57) ABSTRACT

Method of assisting regeneration of a depollution device (1) associated with an oxidation catalyst (2) and integrated in an exhaust line (3) of a motor vehicle diesel engine (4), in which a common ramp supplies fuel to the cylinders of the engine, by shifting the engine (4), through modification of engine operation control parameters and use of fuel post-injections into the cylinders, among four strategies of regeneration of the depollution device (1), the first called normal engine operation strategy, the second called level 1 strategy, the third called level 2 strategy and the fourth called over-calibrated level 2 strategy, enabling different thermal levels to be achieved in the exhaust line, with looping back of the strategies, until detection of a request for stopping the regeneration.

12 Claims, 2 Drawing Sheets

METHOD OF ASSISTING REGENERATION OF POLLUTION MANAGEMENT MEANS ASSOCIATED WITH CATALYST FORMING MEANS

The present invention concerns a system for assisting the regeneration of depollution means integrated in an exhaust line of a motor vehicle diesel engine.

BACKGROUND ART

More particularly, the invention relates to such a system in which the engine is associated with common rail means for the supply of fuel to the cylinders thereof, according to at least one post-injection.

Such a post-injection is, in a standard manner, an injection of fuel after the high dead center of the cylinder under consideration.

These supply means are adapted to implement, at iso-torque, through modification of parameters for controlling the operation of the engine, different regeneration strategies making it possible to obtain different thermal levels in the exhaust line.

Thus, for example, supply means implementing a first regeneration strategy according to a strategy called level 1 strategy and a second regeneration strategy called level 2 strategy and/or an over-calibrated level 2 strategy, have already been proposed.

Indeed, it is known that, to ensure the regeneration of depollution means such as a particle filter, the soot trapped therein are burned with the help of the thermal energy provided by the engine and to the exotherm performed by the conversion of the HC and of the CO on means forming oxidation catalyst placed, for example, upstream of the particle filter.

This combustion can be assisted by a catalyzing element mixed with the soot, coming, for example, from a regeneration assistance additive, mixed to the fuel supplied to the engine or by a catalyst deposited directly on the walls of the particle filter (catalyzed particle filter).

The higher the thermal levels in the exhaust line at the inlet of the particle filter, the shorter the duration of the filter regeneration.

However, in critical driving conditions, such as, for example, city driving or in traffic jams, the levels reached through these standard strategies for assisting regeneration of the particle filter can prove insufficient to ensure the correct regeneration of the filter, which can translate into regenerations that last very long and are thus highly fuel-consuming, or even incomplete.

SUMMARY OF THE INVENTION

Any strategy for raising the thermal levels during these critical driving conditions makes it then possible to ensure complete regenerations, to reduce the over-consumption due to this regeneration of the particle filter, and above all to increase the security margin with respect to the cracking or the breakage of these filters.

The objective of the invention is to propose such a strategy.

To this effect, an object of the invention is a system for assisting the regeneration of depollution means associated with means forming oxidation catalyst and integrated in an exhaust line of a motor vehicle diesel engine, in which the engine is associated with common rail means for the supply of fuel to the cylinders of the engine, adapted, through modification of parameters for controlling the operation of the engine and by implementing post-injections of fuel into the cylinders thereof, to shift the engine among four regeneration strategies of the depollution means, the first strategy called normal engine operation strategy, the second strategy called level 1 strategy, the third strategy called level 2 strategy, and the fourth strategy called over-calibrated level 2 strategy, making it possible to obtain different thermal levels in the exhaust line, the thermal level obtained by applying the over-calibrated level 2 strategy being higher than that obtained by applying the level 2 strategy, which is itself higher than that obtained by applying the level 1 strategy, which is itself higher than that obtained by applying the normal strategy, characterized in that the supply means are connected to means for detecting a request for regeneration of the depollution means to drive the supply means so as to start operation of the engine according to the level 1 strategy, means for monitoring the priming state of the means forming catalyst to start the over-calibrated level 2 strategy, means for acquiring the thermal level in the exhaust line to start the level 2 strategy of the engine when this thermal level is higher than a predetermined target temperature, during a first predetermined time period, or to cut the regeneration if this temperature has not been reached before the expiration of a second predetermined maximal time period, and means for monitoring the operation at level 2 of the engine to drive operation of the engine at over-calibrated level 2 if the thermal level in the exhaust line goes under a predetermined low temperature threshold during a third time period, or at level 1 if the thermal level in the exhaust line goes over a predetermined high temperature threshold during a fourth time period, to maintain this operation of the engine according to this level 1 strategy during a fifth predetermined forcing time period or until the time when the thermal level in the exhaust line has gone under the high temperature threshold minus a hysteresis gap during a sixth time period, to drive operation of the engine according to the normal strategy in the case where the thermal level in the exhaust line has not gone under the high temperature threshold minus the hysteresis gap at the end of a seventh maximal cooling time period until the thermal level in the exhaust line has again gone under this high temperature threshold minus the hysteresis gap during the sixth time period, and this, with looping back of the strategies, until the detection of a request for stopping the regeneration by the detection means.

According to other characteristics:
- the high and low target temperatures are capable of being calibrated;
- the time periods are capable of being calibrated;
- the hysteresis values are capable of being calibrated;
- it comprises means for emitting the request for regeneration and for stopping thereof,
- the means for monitoring the priming state of the means forming catalyst and for acquiring the thermal level in the exhaust line comprise temperature sensors;
- the depollution means comprise a particle filter;
- the particle filter is catalyzed;
- the depollution means comprise an NOx trap;
- the fuel comprises an additive intended to become deposited, with the particles to which it is mixed, on the depollution means to facilitate their regeneration;
- the fuel comprises an additive forming NOx trap;
- the depollution means are impregnated with an SCR formulation ensuring a CO/HC oxidation function; and
- the engine is associated with a turbo-compressor.

BRIEF DESCRIPTION OF THE DRAWINGS

The invention will be better understood by reading the following description given by way of example only and made in reference to the annexed drawings, in which.

DETAILED DESCRIPTION OF PARTICULAR EMBODIMENTS

Figure 1:
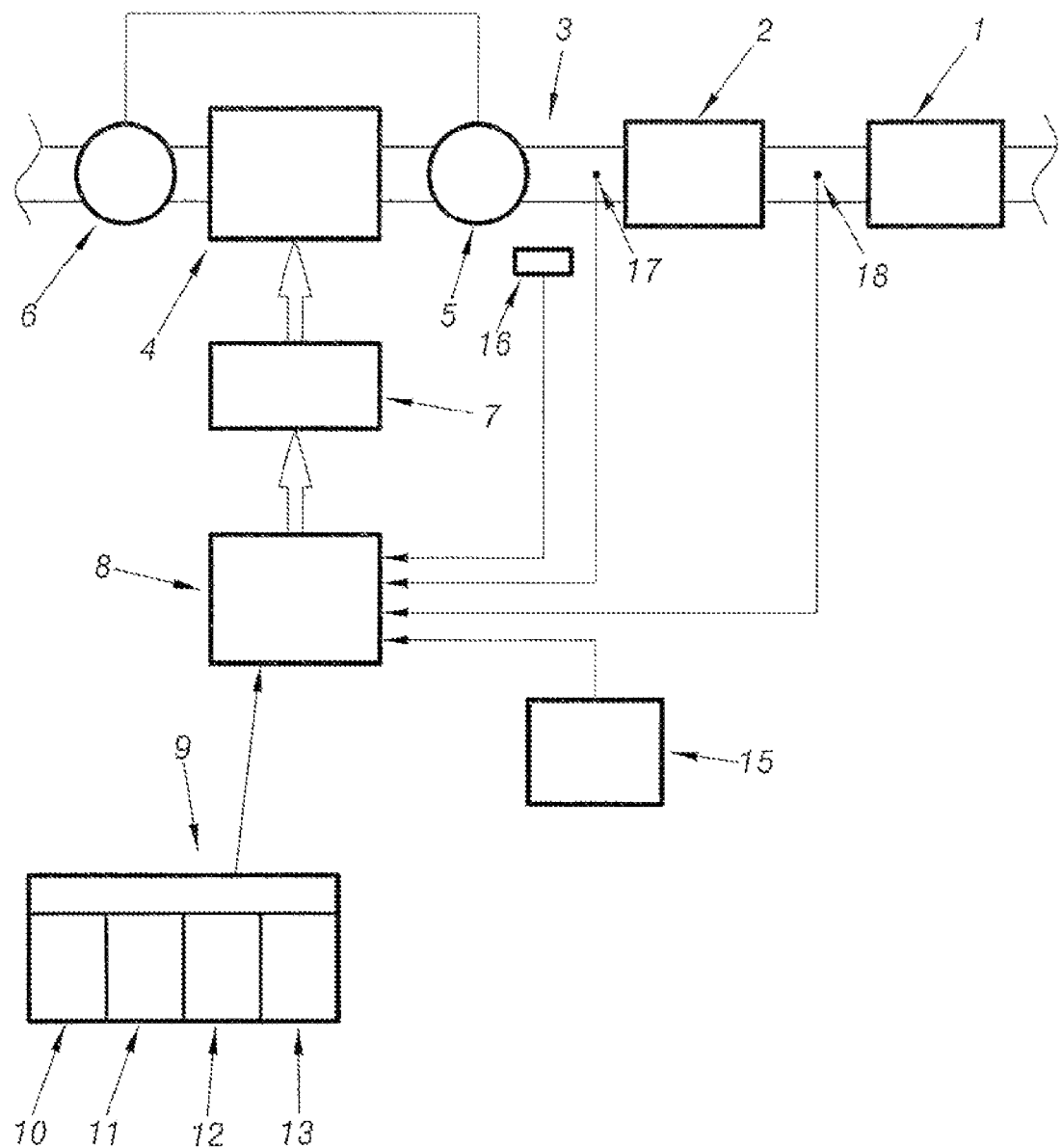
FIG. 1 is a schematic synoptic view illustrating the structure of an assistance system according to the invention.

Indeed, FIG. 1 shows a system for assisting the regeneration of depollution means designated by the general reference 1, associated with means forming oxidation catalyst, designated by the general reference 2 and placed in an exhaust line 3 of a thermal engine such as a motor vehicle diesel engine.

This engine is designated by the general reference 4 and can be associated with, for example, a turbo-compressor whose turbine portion 5 is associated with the exhaust line and whose compressor portion 6 is placed upstream of the engine.

The engine is associated with common rail means for the supply of fuel to the cylinders thereof, designated by the general reference 7, whose operation is controlled by a supervisor 8.

These means are then adapted to control the operation of the engine, and in particular, through modification of parameters for controlling the operation of this engine, to shift this engine between four regeneration strategies of the depollution means, designated by the general reference 9 on this figure, a first strategy called normal engine operation strategy, 10, a second strategy called level 1 strategy, 11, a third strategy called level 2 strategy, 12, and a fourth strategy called over-calibrated level 2 strategy, 13, making it possible to obtain different thermal levels in the exhaust line.

In this way, the thermal level obtained by applying the fourth, over-calibrated level 2 strategy is higher than that obtained by applying the third, level 2 strategy, which is itself higher than that obtained by applying the second, level 1 strategy, which is itself higher than that obtained by applying the first, so-called normal strategy.

The supervisor 8 is also connected to means for emitting a request for regeneration of the depollution means or for stopping thereof, designated by the general reference 15 on this FIG. 1, and to different temperature sensors, for example, 16, 17, and 18, distributed in the exhaust line to acquire the thermal levels therein, as will be described more in details below.

The temperature sensor 16 is adapted to acquire, for example, the thermal level in the exhaust line, while the sensors 17 and 18, placed on both sides of the means forming catalyst, make it possible to determine, for example, the priming state thereof, in a standard manner.

Figure 2:
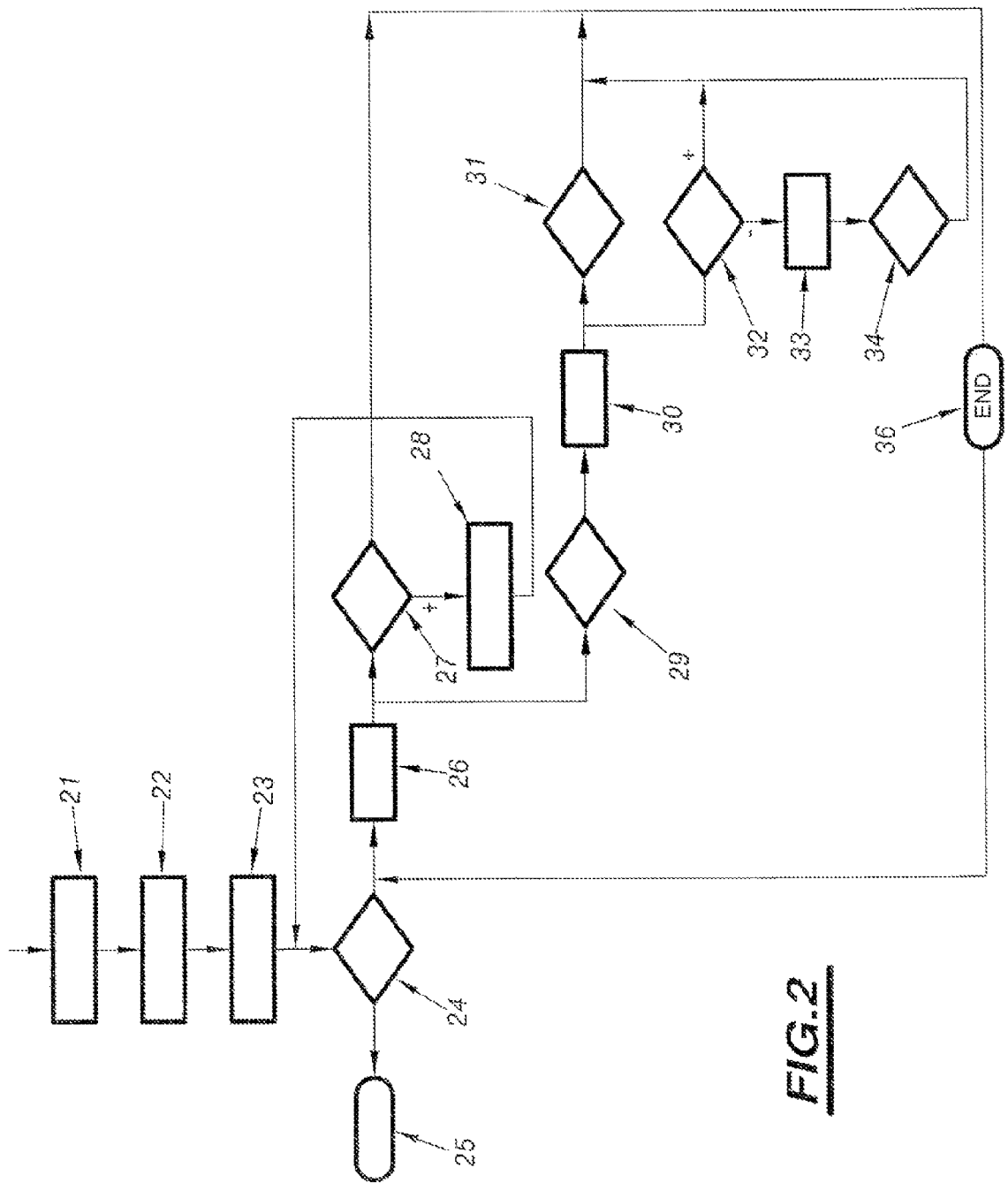
FIG. 2 is a flow chart illustrating the operation thereof.

The operation of this system is illustrated on FIG. 2 and begins with the reception by the supervisor 8 of a request for regeneration of the depollution means.

Upon detection of this regeneration request, the supply means 7, 8 are then adapted to start operation of the engine according to the second, level 1 strategy, at 21.

These means then ensure a monitoring of the priming state of the means forming catalyst at 22, to trigger, as soon as the means forming catalyst are activated, the fourth, over-calibrated level 2 strategy, at 23.

The thermal level in the exhaust line is then acquired and analyzed to trigger the level 2 strategy of the engine when this thermal level goes over a predetermined target temperature during a first predetermined time period or to cut the regeneration if this temperature has not been reached before expiration of a second predetermined maximal time period.

These different tests are designated by the general reference 24 on this Figure, the end of regeneration being designated by the general reference 25, while the start of the level 2 strategy is designated by the general reference 26.

The operation of the engine at level 2 is then monitored to trigger an operation of this engine at over-calibrated level 2 if the thermal level in the exhaust line goes under a predetermined low temperature threshold during a third time period, and this, after looping back of the strategies, until the detection of a request for stopping regeneration by the detection means.

These different tests are designated by the general reference 27 on this Figure, which, as long as the thermal level in the exhaust line has not gone back under the predetermined low temperature, is looped back to the level of step 26 of level 2 strategy, and in the case where the thermal level in the exhaust line goes under the predetermined low temperature, shifts the engine to an operation at over-calibrated level 2 at 28, which loops back to the test step 24 described above.

Further, the operation of the engine at level 2, at 26, is also monitored to trigger an operation of this engine at level 1 if the thermal level in the exhaust line goes over a predetermined high temperature threshold during a fourth time period.

These different tests are designated by the general reference 29 on this Figure, the operation of the engine at level 1 being designated by the general reference 30.

The supervisor then maintains this operation of the engine according to this level 1 at 30, during a predetermined fifth, forcing time period, at 31, or until the time when the thermal level in the exhaust line has gone back, at 32, under the high temperature threshold minus a hysteresis gap during a sixth time period. If this is not the case, the supervisor is adapted to drive an operation of the engine according to the first normal strategy, at 33, in the case where the thermal level in the exhaust line has not gone back under the high temperature threshold minus a hysteresis gap at the end of a seventh, maximal cooling time period, until the thermal level in the exhaust line has gone back under this high temperature threshold minus the hysteresis gap during the sixth time period as illustrated at 34.

The supervisor loops back these strategies until the detection of a request for stopping the regeneration at 36.

This makes it then possible to maximize the chances of success for the regeneration, in particular in critical driving conditions, such as, for example, city driving or in traffic jams.

It is self-evident that the determined high and low target temperatures are capable of being calibrated, similarly to the time periods mentioned above and to the hysteresis values.

By way of example, one can go from the following criteria for a standard calibration for assisting the regeneration of a particle filter at level 2:

maximal exhaust collector temperature=800° C.
maximal catalyzer exotherm=150° C.
maximal catalyzer outlet temperature=710° C.
maximal catalyzer internal temperature=760° C.
minimal oxygen content of the gases at catalyzer outlet=3% to the following criteria for an over-calibrated level 2 strategy:

maximal exhaust collector temperature=830° C.
maximal catalyzer exotherm=200° C.
maximal catalyzer outlet temperature=730° C.
maximal catalyzer internal temperature=no maximal value minimal oxygen content of the gases at catalyzer outlet=2%

With the following results:

| | |
|---|---|
| EUDC cycles | Temperature at PF inlet of 600° C. reached in 200 sec. instead of 600 sec. with the standard RG |
| | Temperature at PF inlet of 650° C. reached in 220 sec. whereas this temperature is never reached with the standard RG |
| City cycle | Temperature at PF inlet of 500° C. reached in 100 sec. instead of 150 sec. with the standard RG |
| | Temperature at PF inlet of 550° C. reached in 105 sec. instead of 300 sec. with the standard RG |
| | Temperature at PF inlet of 600° C. reached in 150 sec. whereas this temperature is never reached with the standard RG |

It is of course self-evident that different embodiments of this system can be envisioned, and that the depollution means can comprise a particle filter, such as, for example, a catalyzed particle filter or an NOx trap.

In addition, the fuel can also comprise an additive intended to be deposited with the particle with which it is mixed, on the depollution means to facilitate their regeneration.

These depollution means can also be impregnated with an SCR formulation ensuring a CO/HC oxidation function in a standard manner.

Other means forming oxidation catalyst can be envisioned, and the depollution means and the means forming oxidation catalyst can be integrated into a single and same element, in particular on the same substrate.

By way of example, a particle filter integrating the oxidation function can be envisioned.

Similarly, an NOx trap integrating an oxidation function can also be envisioned, whether it is additivized or not.

This oxidation and/or NOx trap function can be fulfilled, for example, by an additive mixed with the fuel.

The invention claimed is:

1. Method of assisting the regeneration of depollution means associated with means forming oxidation catalyst and integrated in an exhaust line of a motor vehicle diesel engine, in which the engine is associated with common rail means for the supply of fuel to the cylinders of the engine, said method comprising:
   (a) shifting the engine, through modification of parameters for controlling the operation of the engine and by implementing post-injections of fuel into the cylinders thereof via the supply means, among four regeneration strategies of the depollution means,
      a first of said strategies being called normal engine operation strategy,
      a second of said strategies being called level 1 strategy,
      a third of said strategies being called level 2 strategy, and
      a fourth of said strategies being called over-calibrated level 2 strategy,
      wherein said strategies provide different thermal levels in the exhaust line, a fourth thermal level obtained by applying the over-calibrated level 2 strategy being higher than a third thermal level obtained by applying the level 2 strategy, which is itself higher than a second thermal level obtained by applying the level 1 strategy, which is itself higher than a first thermal level obtained by applying the normal strategy,
   (b) detecting a request for regeneration of the depollution means and driving the supply means so as to start operation of the engine according to the level 1 strategy when a request for regeneration of the depollution means is detected,
   (c) monitoring the priming state of the means forming catalyst and starting the over-calibrated level 2 strategy when the means forming catalyst is primed,
   (d) acquiring the thermal level in the exhaust line and (i) starting the level 2 strategy of the engine when this thermal level is higher than a predetermined target temperature, during a first predetermined time period or (ii) cutting the regeneration if this temperature has not been reached before the expiration of a second predetermined maximal time period, and
   (e) monitoring the operation at level 2 of the engine and driving operation of the engine:
      at over-calibrated level 2 if the thermal level in the exhaust line goes back under a predetermined low temperature threshold during a third time period,
      at level 1 if the thermal level in the exhaust line goes over a predetermined high temperature threshold during a fourth time period,
      according to this level 1 strategy during a fifth predetermined forcing time period or until the time when the thermal level in the exhaust line has gone back under the high temperature threshold minus a hysteresis gap during a sixth time period, and
      according to the normal strategy in the case where the thermal level in the exhaust line has not gone back under the high temperature threshold minus the hysteresis gap at the end of a seventh maximal cooling time period until the thermal level in the exhaust line has gone back under this high temperature threshold minus the hysteresis gap during the sixth time period,
      and this, with looping back of the strategies, until detection of a request for stopping the regeneration.

2. Method according to claim 1, wherein the high and low target temperatures are calibratable.

3. Method according to claim 1, wherein the time periods are calibratable.

4. Method according to claim 1, wherein the hysteresis values are calibratable.

5. Method according to claim 1, comprising monitoring the priming state of the means forming catalyst and acquiring the thermal level in the exhaust line by temperature sensors.

6. Method according to claim 1, wherein the depollution means comprise a particle filter.

7. Method according to claim 6, wherein the particle filter is catalyzed.

8. Method according to claim 1, wherein the depollution means comprise an NOx trap.

9. Method according to claim 1, wherein the fuel comprises an additive intended to become deposited, with the particles with which it is mixed, on the depollution means to facilitate their regeneration.

10. Method according to claim 1, wherein the fuel comprises an additive forming NOx trap.

11. Method according to claim 1, wherein the depollution means are impregnated with an SCR formulation ensuring a CO/HC oxidation function.

12. Method according to claim 1, wherein the engine is associated with a turbo-compressor.

* * * * *